US009761046B2

(12) United States Patent
Chang et al.

(10) Patent No.: US 9,761,046 B2
(45) Date of Patent: Sep. 12, 2017

(54) COMPUTING DEVICE AND SIMULATION METHOD FOR PROCESSING AN OBJECT

(71) Applicant: ScienBiziP Consulting (Shenzhen) Co., Ltd., Shenzhen (CN)

(72) Inventors: Chih-Kuang Chang, New Taipei (TW); Xin-Yuan Wu, Shenzhen (CN); Peng Xie, Shenzhen (CN)

(73) Assignee: ScienBiziP Consulting(Shenzhen)Co., Ltd., Shenzhen (CN)

( * ) Notice: Subject to any disclaimer, the term of this patent is extended or adjusted under 35 U.S.C. 154(b) by 597 days.

(21) Appl. No.: 14/339,612

(22) Filed: Jul. 24, 2014

(65) Prior Publication Data

US 2015/0032422 A1   Jan. 29, 2015

(30) Foreign Application Priority Data

Jul. 26, 2013   (CN) .................. 2013 1 03201690

(51) Int. Cl.
*G06G 7/48* (2006.01)
*G06T 17/10* (2006.01)

(52) U.S. Cl.
CPC .................. *G06T 17/10* (2013.01)

(58) Field of Classification Search
CPC ..... G06F 17/5009; G06T 15/30; G06T 17/20; G06T 19/00
USPC .............................. 345/419, 423, 621; 703/6
See application file for complete search history.

(56) References Cited

U.S. PATENT DOCUMENTS

| 6,978,230 | B1 * | 12/2005 | Klosowski | G06T 17/20 345/420 |
| 8,860,733 | B2 * | 10/2014 | Miyata | G05B 19/4069 345/419 |
| 2003/0103049 | A1 * | 6/2003 | Kindratenko | G06T 17/20 345/423 |
| 2013/0120391 | A1 * | 5/2013 | Brown | G06T 11/203 345/441 |

* cited by examiner

*Primary Examiner* — Andy Ho
(74) *Attorney, Agent, or Firm* — Steven Reiss

(57) ABSTRACT

A computing device simulates a process of processing an object. The computing device calculates a moving space when a minimum bounding box of a model of a blade moves from a position point to an obtained path point. The computing device cuts a triangulated model of the object when the triangulated model of the object intersects the moving space.

18 Claims, 8 Drawing Sheets

COMPUTING DEVICE AND SIMULATION METHOD FOR PROCESSING AN OBJECT

CROSS-REFERENCE TO RELATED APPLICATIONS

This application claims priority to Chinese Patent Application No. 201310320169.0 filed on Jul. 26, 2013 in the State Intellectual Property Office of the People's Republic of China, the contents of which are incorporated by reference herein.

FIELD

Embodiments of the present disclosure relate to a simulation technology, and particularly to a computing device and a simulation method for processing an object.

BACKGROUND

A computerized numerical control (CNC) machine is used to process a component of an object (for example, a shell of a mobile phone). However, the CNC machine may fail when the CNC machine runs many times, for example, a blade of the CNC machine needs to be periodically changed if the CNC machine runs in a long time period, such as one month.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
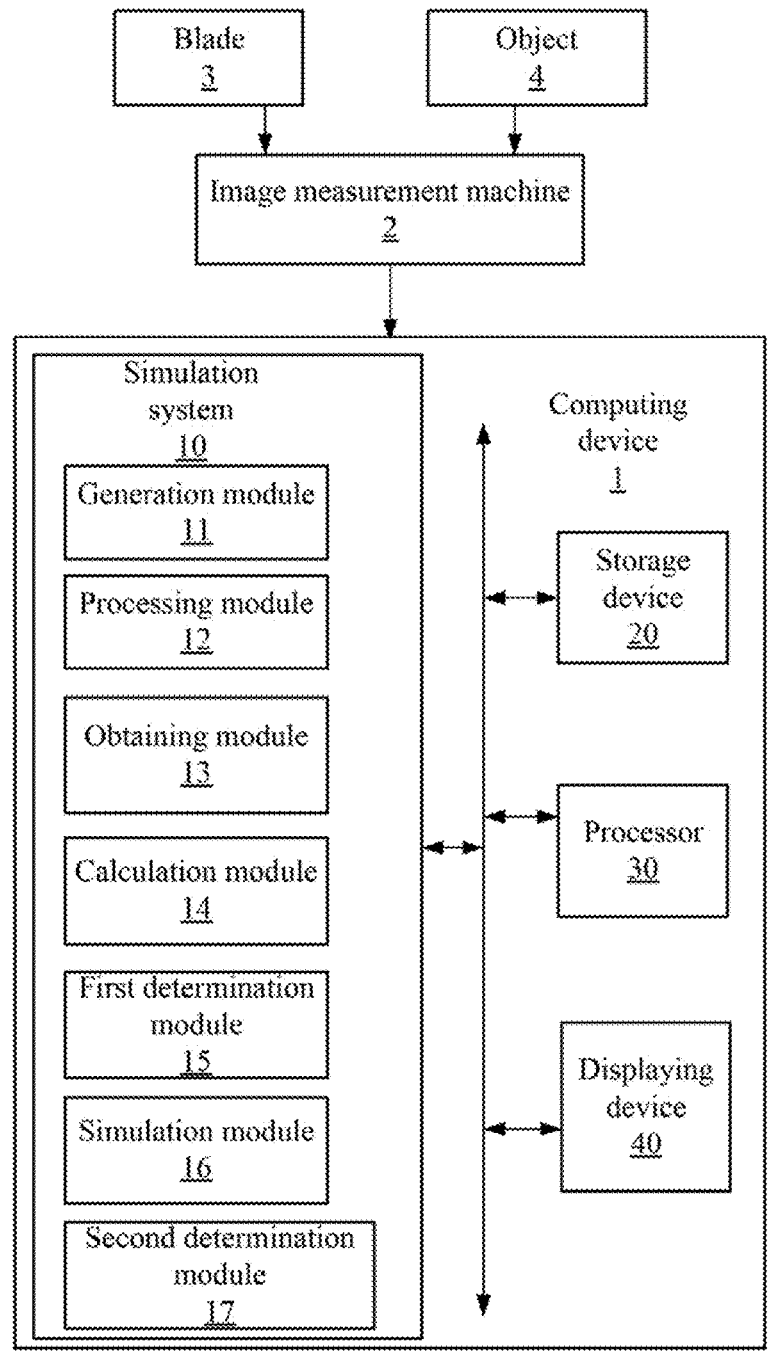
FIG. 1 illustrates a block diagram of an example embodiment of a computing device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented. The term "module" refers to logic embodied in computing or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or computing modules and may be stored in any type of non-transitory computer-readable medium or other storage device. Some non-limiting examples of non-transitory computer-readable media include CDs, DVDs, BLU-RAY™, flash memory, and hard disk drives. The term "comprising" means "including, but not necessarily limited to"; it specifically indicates open-ended inclusion or membership in a so-described combination, group, series and the like.

FIG. 1 illustrates a block diagram of an example embodiment of a computing device 1. In the embodiment, the computing device 1 provides functions of connections, so that an image measurement machine 2 can be connected to the computing device 1. The image measurement machine 2 can measure a blade 3 and an object 4 to obtain three-dimensional data of the blade 3 and the object 4. The blade 3 is positioned in a computerized numerical control (CNC) machine, and the object 4 is a component of a product, such as a shell of a mobile phone. The computing device 1 generates a model of the blade 3 and a model of the object 4 according to the three-dimensional data of the blade 3 and object 4. The computing device 1 can be, but is not limited to, a tablet computer, a server, a personal computer or any other computing device. In the example embodiment, the computing device 1 includes, but is not limited to, a simulation system 10, a storage device 20, at least one processor 30, and a displaying device 40. FIG. 1 illustrates only one example of the computing device 1, and other examples can comprise more or fewer components than those shown in the embodiment, or have a different configuration of the various components.

In one embodiment, the storage device 20 can be an internal storage device, such as a flash memory, a random access memory (RAM) for temporary storage of information, and/or a read-only memory (ROM) for permanent storage of information. The storage device 20 can also be an external storage device, such as an external hard disk, a storage card, or a data storage medium. The at least one processor 30 can be a central processing unit (CPU), a microprocessor, or other data processor chip that performs functions of the computing device 1. The storage device 20 stores the three-dimensional data of the blade 3 and the object 4. The storage device 20 stores a CNC processing program. The CNC processing program is an array program which consists of a plurality of coordinates of path points. In addition, the CNC processing program can be, but is not limited to, a TXT format file. The displaying device 40 displays the model of the blade 3 and the model of the object 4.

The simulation system 10 comprises, but is not limited to, a generation module 11, a processing module 12, an obtaining module 13, a calculation module 14, a first determination module 15, a simulation module 16, and a second determination module 17. Modules 11-17 can comprise computerized instructions in the form of one or more computer-readable programs that can be stored in a non-transitory computer-readable medium, for example the storage device 20, and executed by the at least one processor 30 of the computing device 1. A detailed description of the functions of the modules 11-17 is given below in reference to FIG. 1.

The generation module 11 generates the model of the blade 3 according to the three-dimensional data of the blade 3 and the model of the object 4 according to the three-dimensional data of the object 4. The three-dimensional data of the blade 3 and the object 4 are obtained by the image measurement machine 2.

The processing module 12 triangulates the model of the object 4 using a plurality of triangles. In one embodiment, the model of the object 4 can be represented by the plurality of triangles (hereinafter, referred to as "the triangulated model of the object 4") after triangulation.

Figure 2:
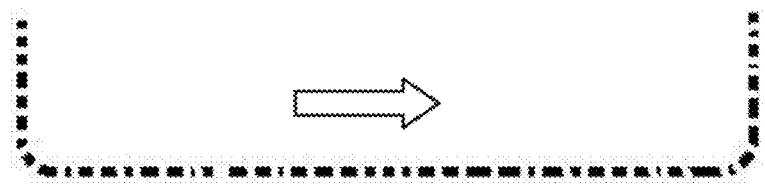
FIG. 2 shows a plan view of an example of a processing path consisting of a plurality of path points.

The obtaining module 13 obtains coordinates of each path point from the CNC processing program, and generates a processing path according to the coordinates of each path point. As shown in FIG. 2, the processing path is generated by the path points.

The calculation module 14 obtains coordinates of a position point of the model of the blade 3 and coordinates of a path point from the processing path. The position point of the model of the blade 3 is a center point of the blade 3. For example, if the blade 3 is a circular shape, the position point is the center point of the circular shape, and the coordinates of a position point of the model of the blade 3 is the coordinates of the center point of the circular shape. In addition, the position point also can be predetermined according to user requirements. The path points are obtained from the processing path in order. For example, as shown in FIG. 2, the path points are obtained one by one according to an arrow direction.

Figure 3A:
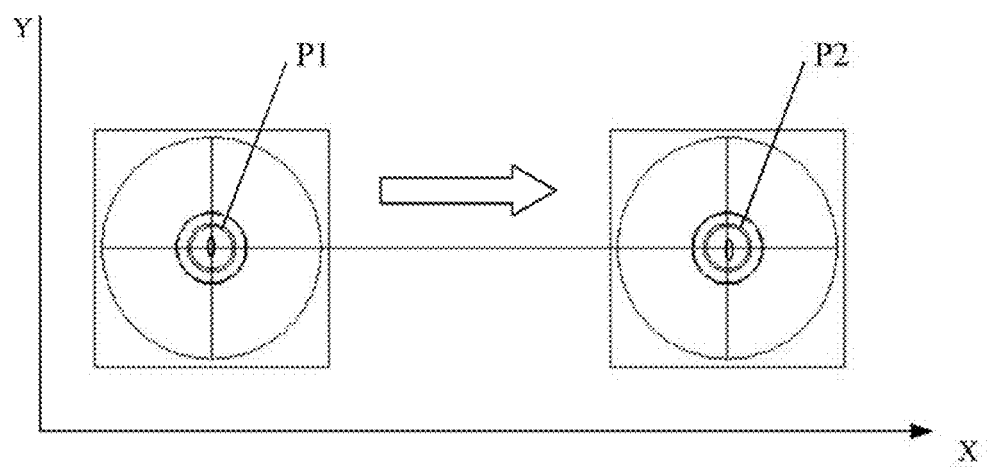
FIG. 3A shows a two-dimensional plan view of an example of a model of a blade which moves from a position point P1 towards a path point P2.
Figure 3B:
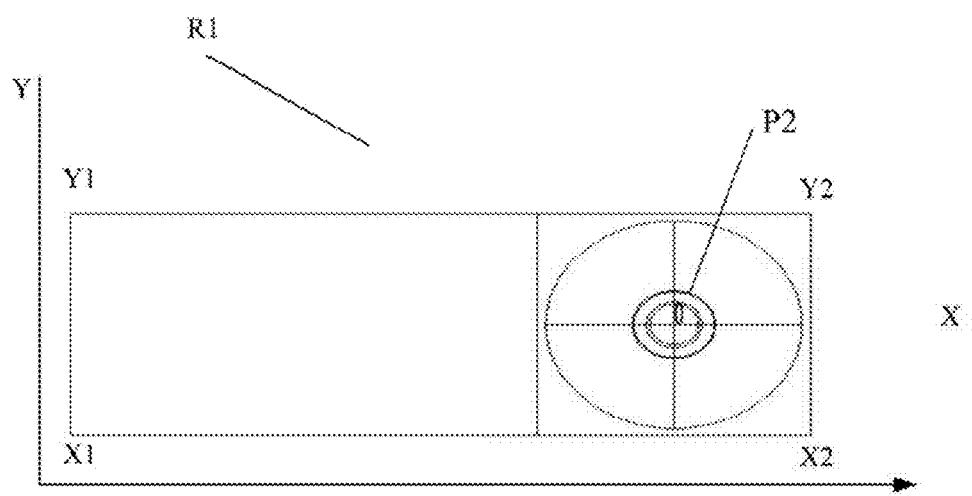
FIG. 3B shows a two-dimensional plan view of an example of a moving space when the model of the blade moves from a position point P1 towards a path point P2.
Figures 4A, 4B:
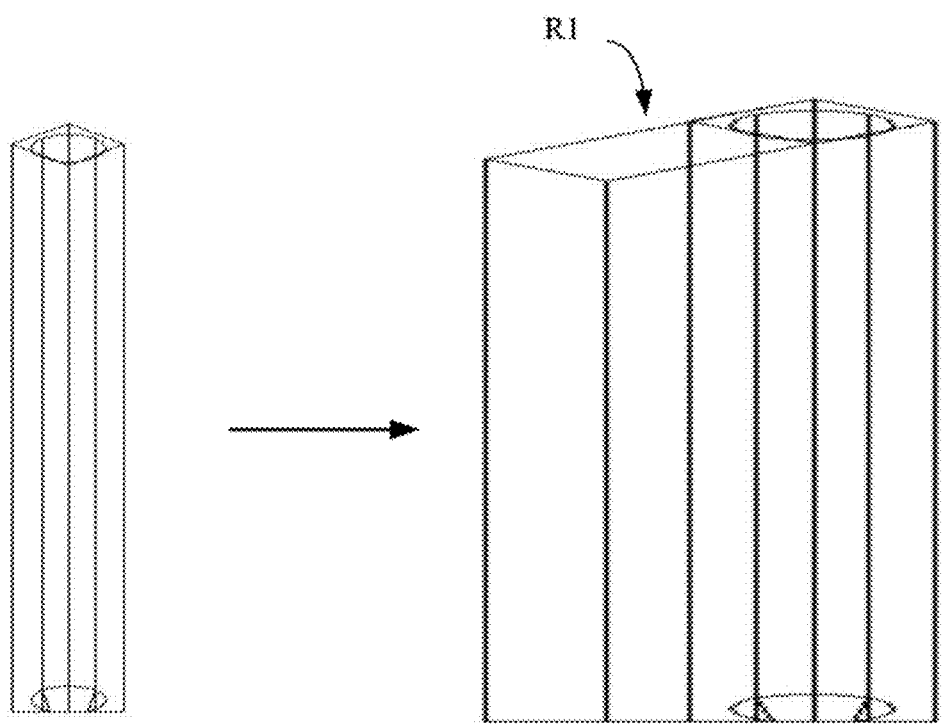
FIG. 4A shows a three-dimensional plan view of an example of the model of the blade which moves from the position point P1 towards the path point P2.
FIG. 4B shows a three-dimensional plan view of an example of the moving space when the model of the blade moves from the position point P1 towards the path point P2.
Figure 5:
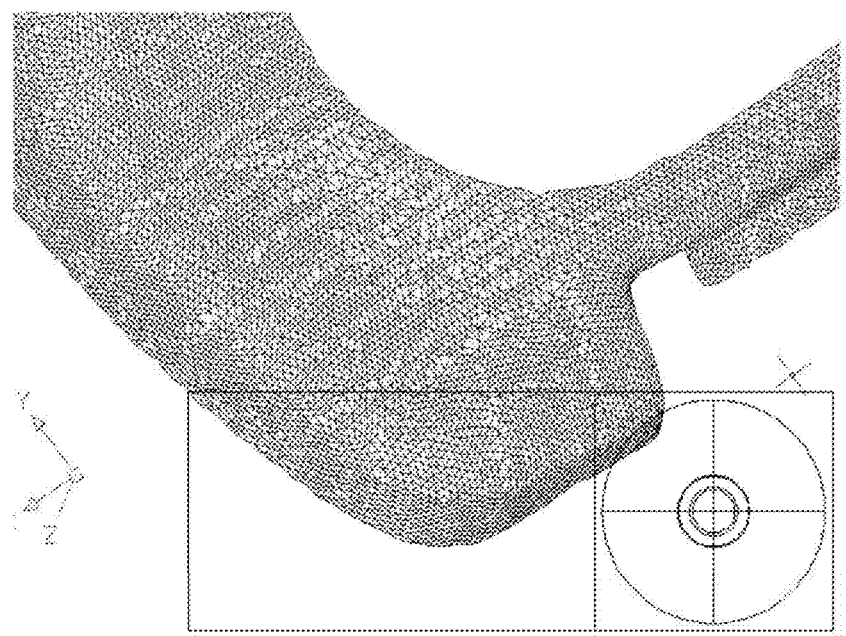
FIG. 5 shows a plan view of an example of an intersection between the moving space and a triangulated model of an object.

The calculation module 14 calculates a moving space when a minimum bounding box of the model of the blade 3 moves from the position point to the obtained path point. The minimum bounding box is the smallest box (e.g., a cube box or a rectangular box) that can enclose the model of the blade 3. As shown in FIG. 3A, the minimum bounding box which encloses the model of entire blade 3 is shown in a two-dimensional coordinate system. As shown in FIG. 4A, the minimum bounding box which encloses the model of entire blade 3 is shown in a three-dimensional coordinate system. For example, as shown in FIG. 3A and FIG. 3B, the minimum bonding box of the model of the blade 3 moves from the position point P1 to the obtained path point P2 and generates the moving space R1. As shown in FIG. 3B, the moving space R1 (e.g., R1 is enclosed by four points Y1, Y2, X1, and X2) is shown in a two-dimensional coordinate system. As shown in FIG. 4B, the moving space R1 is shown in a three-dimensional coordinate system. The moving space is calculated by a formula as follow: M=S*D, where M is a volume of the moving space, S is a volume of the minimum bonding box of the model of the blade 3, and D is a distance from the position point to the obtained path point.

Figure 6:
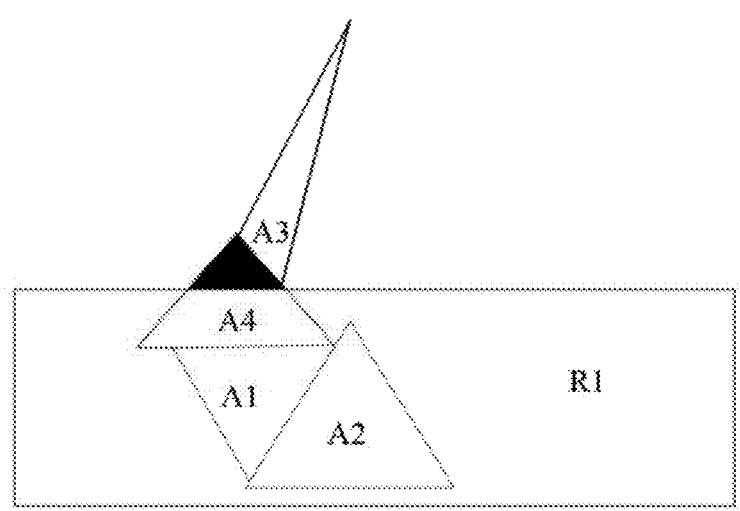
FIG. 6 shows a plan view of an example of a process of cutting triangulated model of the object.

The first determination model 15 determines if the triangulated model of the object 4 intersects the moving space. The triangulated model of the object 4 intersects the moving space upon the condition that at least one triangle intersects the moving space. As shown in FIG. 6, the triangulated model of the object 4 intersects the moving space R1.

The simulation module 16 cuts the triangulated model of the object 4 when the triangulated model of the object 4 intersects the moving space. In one embodiment, since the triangulated model of the object 4 consists of a plurality of the triangles, the simulation module 16 cuts the triangles of the triangulated model of the object 4 if the triangles intersect the moving space. If a triangle of the triangulated model of the object 4 is enclosed by the moving space, the simulation module 16 entirely cuts the triangle from the triangulated model of the object 4. If the triangle of the triangulated model of the object 4 falls partially inside the moving space, the simulation module 16 cuts a part of the triangle which falls inside the moving space from the triangulated model of the object 4. Furthermore, if the triangle falls outside the moving space, the triangle is kept in the triangulated model of the object 4.

The simulation module 16 further simulates a moving process when the model of the blade 3 moves from the position point to the obtained path point. The moving process can be displayed on the displaying device 40, so that a user can view and monitor the moving process.

The second determination module 17 determines if all of the path points are obtained from the processing path.

The model of the blade 3 moves to another path point, repeatedly calculates another moving space, and then cuts the triangulated model of the object 4 when the triangulated model of the object 4 intersects the another moving space. The model of the blade 3 stops cutting the triangulated model of the object 4 until all of the path points are obtained from the processing path. The simulation module 16 generates a shaped model of the object 4 upon the condition that all of the path points are obtained from the processing path. The shaped model of the object is processed by the model of the blade 3 according to all of the path points.

The computing device 1 repeatedly processes the triangulated model of the object 4 until all of the path points are obtained from the processing path.

Figure 7:
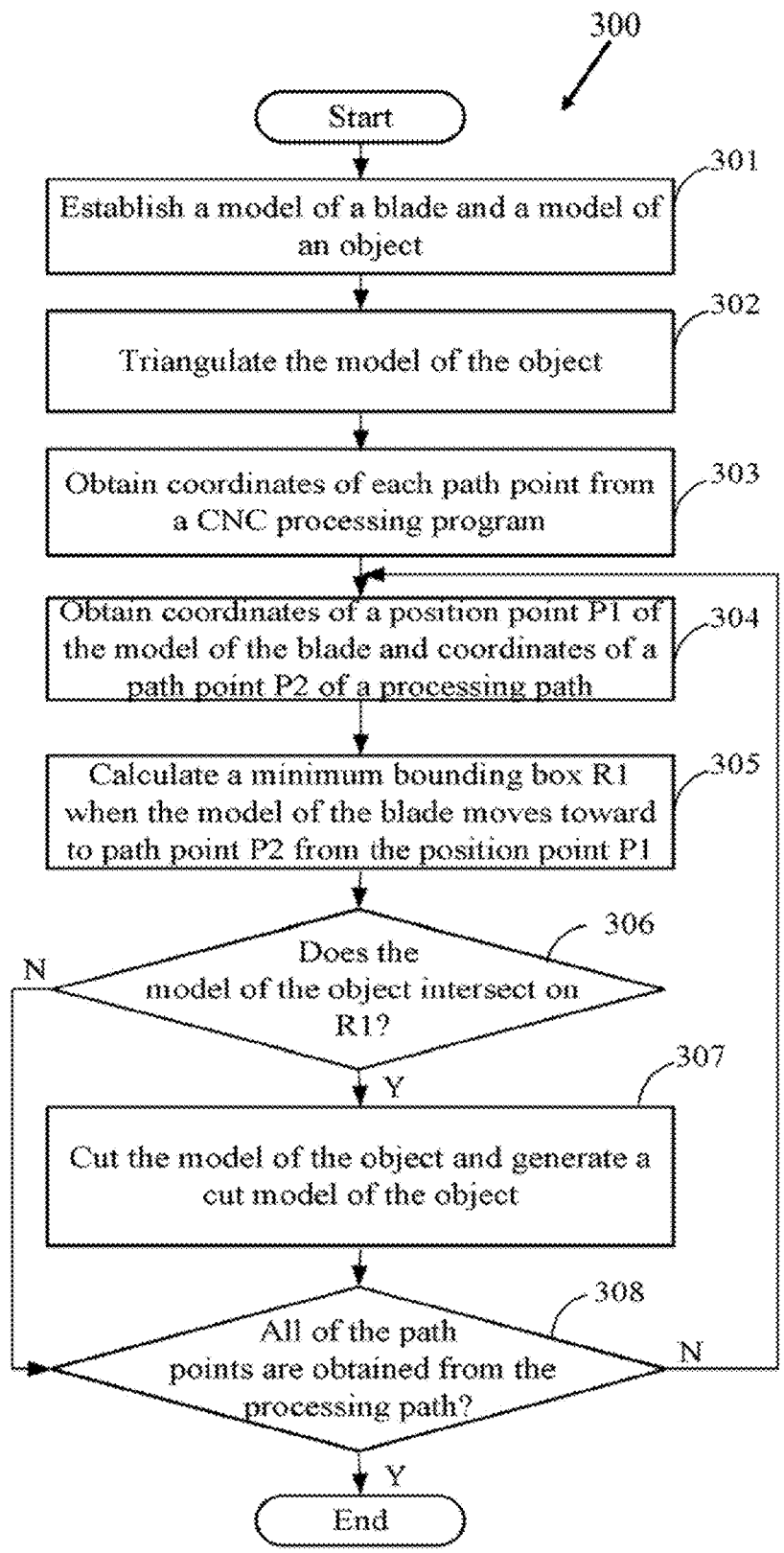
FIG. 7 is a flowchart of an example embodiment of a simulation method for processing the object.

FIG. 7 illustrates a flowchart of an example embodiment of a simulation method for processing an object. In an example embodiment, the simulation method is performed by execution of computer-readable software program codes or instructions by at least one processor of a computing device, and can automatically processes the object.

Referring to FIG. 7, a flowchart is presented in accordance with an example embodiment. The method 300 is provided by way of example, as there are a variety of ways to carry out the method. The method 300 described below can be carried out using the configurations illustrated in FIGS. 1 and 7, for example, and various elements of these figures are referenced in explaining example method 300. Each block shown in FIG. 7 represents one or more processes, methods, or subroutines, carried out in the method 300. Furthermore, the illustrated order of blocks is illustrative only and the order of the blocks can be changed. Additional blocks can be added or fewer blocks may be utilized without departing from this disclosure. The example method 300 can begin at block 301.

In block 301, a generation module generates a model of a blade and a model of an object according to three-dimensional data of the blade and the object. The three-dimensional data of the blade includes coordinates of the points consisting of the blade. The three-dimensional data of the object includes coordinates of the points consisting of the object.

In block 302, a processing module triangulates the model of the object using a plurality of triangles. In the embodiment, the model of the object consists of plurality of triangles after the model of the object is triangulated.

In block 303, an obtaining module obtains coordinates of each path point from a CNC processing program and generates a processing path according to the coordinates of each path point. As described above, the CNC processing program is an array program which consists of a plurality of coordinates of the path points.

In block 304, a calculation module obtains coordinates of a position point of the model of the blade and coordinates of a path point from the processing path. The coordinates of the position point of the model of the blade are changed when the model of the blade moves. As shown in FIG. 2, the path points are obtained one by one according to an arrow direction. As shown in FIG. 3A, the calculation obtains coordinates of a position point P1 and coordinates of the path point from the processing path P2.

In block 305, the calculation module calculates a moving space when a minimum bounding box of the model of the blade moves from the position point to the obtained path point. In one embodiment, the minimum bounding box is the smallest box (e.g., a cube box or a rectangular box) that can enclose the model of entire blade. The moving space is calculated by a formula as follow: M=S*D, where M is a volume of the moving space, S is a volume of the minimum bonding box of the model of the blade, and D is a distance from the position point to the obtained path point.

In block 306, a first determination model determines if the triangulated model of the object intersects the moving space. In one embodiment, the triangulated model of the object intersects the moving space upon the condition that at least one triangle intersects the moving space. If the triangulated model of the object intersects the moving space, for example, one of the triangles intersects the moving space, the procedure goes to block 307. Otherwise, if the triangulated model of the object does not intersect on the moving space, for example, none of the triangles intersects the moving space, the procedure goes to block 308.

In block 307, a simulation module cuts the triangulated model of the object when the triangulated model of the object intersects the moving space. In one embodiment, the simulation module cuts the triangulated model of the object as follows. If a triangle of the triangulated model of the object is enclosed by the moving space, the simulation module entirely cuts the triangle from the triangulated model of the object. For example, as shown in FIG. 6, the triangles A1 and A2 are entirely enclosed by the moving space, the triangles A1 and A2 is removed from the triangulated model of the object. If the triangle (e.g., A3 shown in FIG. 6) of the triangulated model of the object falls partly inside the moving space, the simulation module cuts a part of the triangle which falls inside the moving space from the triangulated model of the object. For example, as shown in FIG. 6, the triangle A3 is divided into two parts (e.g., a black part and a white part), the white part which falls inside the moving space are removed from the triangulated model of the object, and the black part of the triangle A4 is kept in the triangulated model of the object. Furthermore, if the triangle falls outside the moving space, the triangle is kept in the triangulated model of the object.

In block 307, the simulation module generates a shaped model of the object until all of the path points are obtained from the processing path.

In block 308, a second determination module 17 determines if all of the path points are obtained from the processing path. If all of the path points are obtained from the processing path, the procedure ends. Otherwise, if any one of the path points is not obtained from the processing path, the procedure returns to block 304.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in particular the matters of shape, size and arrangement of parts within the principles of the present disclosure, up to and including the full extent established by the broad general meaning of the terms used in the claims.

What is claimed is:

1. A computing device, comprising:
   at least one processor; and
   a storage device that stores one or more programs, which when executed by the at least one processor, cause the at least one processor to:
   generate a model of a blade according to three-dimensional data of the blade stored in the storage device, and generate a model of an object according to three-dimensional data of the object stored in the storage device;
   triangulate the model of the object using a plurality of triangles;
   obtain coordinates of each path point from a CNC processing program stored in the storage device, and generate a processing path according to the coordinates of each path point;
   obtain coordinates of a position point of the model of the blade and coordinates of a path point from the processing path;
   calculate a moving space when a minimum bounding box of the model of the blade moves from the position point to the obtained path point;
   cut the triangulated model of the object using the model of the blade when the triangulated model of the object intersects the moving space; and
   generate a shaped model of the object upon the condition that all of the path points are obtained from the processing path, and process the shaped model of the object using the model of the blade according to all of the path points.

2. The computing device of claim 1, wherein the three-dimensional data of the blade comprises coordinates of points of the blade, and the three-dimensional data of the object comprises coordinates of points of the object.

3. The computing device of claim 1, wherein the model of the object is represented by the plurality of triangles after triangulation.

4. The computing device of claim 3, wherein the triangulated model of the object intersects the moving space upon the condition that at least one triangle intersects the moving space.

5. The computing device of claim 4, wherein the one or more programs further cause the at least one processor to remove a part of a triangle which falls inside the moving space from the triangulated model of the object.

6. The computing device of claim 1, wherein the processing path is generated by the path points.

7. The computing device of claim 1, wherein the minimum bounding box is the smallest box that encloses the model of the blade.

8. The computing device of claim 1, wherein the moving space is calculated by a formula as follow: M=S*D, wherein M is a volume of the moving space, S is a volume of the minimum bonding box of the model of the blade, and D is a distance from the position point to the obtained path point.

9. The computing device of claim 1, wherein the one or more programs further cause the at least processor to simulate a moving process when the model of the blade moves from the position point to the obtained path point.

10. A computer-based simulation method using a computing device, the simulation method comprising:
   (a) generating a model of a blade according to three-dimensional data of the blade stored in a storage device of the computing device, and generating a model of an object according to three-dimensional data of the object stored in the storage device;
   (b) triangulating the model of the object using a plurality of triangles;
   (c) obtaining coordinates of each path point from a CNC processing program stored in the storage device, and generating a processing path according to the coordinates of each path point;
   (d) obtaining coordinates of a position point of the model of the blade and coordinates of a path point from the processing path;
   (e) calculating a moving space when a minimum bounding box of the model of the blade moves from the position point to the obtained path point;
   (f) cutting the triangulated model of the object using the model of the blade when the triangulated model of the object intersects the moving space; and
   (g) generating a shaped model of the object upon the condition that all of the path points are obtained from the processing path, and processing the shaped model of the object using the model of the blade according to all of the path points.

11. The simulation method of claim 10, wherein the three-dimensional data of the blade comprises coordinates of points of the blade, and the three-dimensional data of the object comprises coordinates of points of the object.

12. The simulation method of claim 10, wherein the model of the object is represented by the plurality of triangles after triangulation.

13. The simulation method of claim 12, wherein the triangulated model of the object intersects the moving space upon the condition that at least one triangle intersects the moving space.

14. The simulation method of claim 13, further comprising:
   removing a part of a triangle which falls inside the moving space from the triangulated model of the object.

15. The simulation method of claim 10, wherein the processing path is generated by the path points.

16. The simulation method of claim 10, wherein the minimum bounding box is the smallest box that encloses the model of the blade.

17. The simulation method of claim 10, wherein the moving space is calculated by a formula as follow: M=S*D, wherein M is a volume of the moving space, S is a volume of the minimum bonding box of the model of the blade, and D is a distance from the position point to the obtained path point.

18. The simulation method of claim 10, further comprising:
   simulating a moving process when the model of the blade moves from the position point to the obtained path point.

* * * * *